United States Patent
MacLeod et al.

(10) Patent No.: US 6,365,675 B1
(45) Date of Patent: Apr. 2, 2002

(54) POLYMERIZATION PROCESSES

(75) Inventors: Paula J. MacLeod; Peter G. Odell; Francisco E. Torres, all of Mississauga; Michael K. Georges, Guelph, all of (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/592,188

(22) Filed: Jun. 12, 2000

Related U.S. Application Data

(62) Division of application No. 08/892,860, filed on Jul. 14, 1997, now Pat. No. 6,121,397.

(51) Int. Cl.$^7$ ................................................. C08F 4/00
(52) U.S. Cl. ....................................... 525/256; 525/259
(58) Field of Search ............................... 525/256, 259, 525/314

(56) References Cited

U.S. PATENT DOCUMENTS

| | | | |
|---|---|---|---|
| 4,385,157 A | | 5/1983 | Auclair et al. .............. 526/316 |
| 4,581,429 A | * | 4/1986 | Solomon ..................... 526/220 |
| 4,665,142 A | | 5/1987 | Engel et al. .................. 526/87 |
| 5,006,617 A | | 4/1991 | Engel et al. .................. 526/87 |

* cited by examiner

Primary Examiner—Christopher Henderson

(57) ABSTRACT

A process for the preparation of a thermoplastic resin, or thermoplastic resins comprising:

forming, or providing a miniemulsion comprised of a mixture of an oligomeric compound of the formula R—SFR, wherein R is an oligomeric compound comprised of from about 1 to about 30 monomer units and optionally a covalently bonded free radical initiator compound, —SFR is a covalently bound stable free radical end group, and at least one free radical polymerizable monomer compound, and a surfactant; and heating the miniemulsion wherein there results a latex thermoplastic resin or a latex of thermoplastic resins with a high monomer to polymer conversion of about 85 to about 100 percent and a narrow polydispersity of from about 1.1 to about 2.0.

2 Claims, No Drawings

POLYMERIZATION PROCESSES

This application is a divisional of application Ser. No. 08/892,860, filed Jul. 14, 1997, now U.S. Pat. No. 6,121,397.

REFERENCE TO COPENDING AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is disclosed free radical polymerization processes for the preparation of a thermoplastic resin or resins comprising: heating from about 100° C. to about 160° C. a mixture comprised of a free radical initiator, a stable free radical agent, and at least one polymerizable monomer compound to form the thermoplastic resin or resins with a high monomer to polymer conversion and a narrow polydispersity; U.S. Pat. No. 5,412,047, issued May 2, 1995, entitled "HOMOPOLYMERIZATION PROCESSES WITH OXONITROXIDES", wherein there is illustrated stable free radical moderated polymerization processes which employ an oxo nitroxide compound which enable the controlled homopolymerization of acrylate and related monomer compounds; U.S. Pat. No. 5,401,804, issued Mar. 28, 1995, which is a divisional application of U.S. Pat. No. 5,322,912, entitled "POLYMERIZATION PROCESS AND TONER COMPOSITIONS THEREFROM"; U.S. Pat. No. 5,449,724, issued Sep. 12, 1995, entitled "STABLE FREE RADICAL POLYMERIZATION PROCESS AND THERMOPLASTIC MATERIALS PRODUCED THEREFROM", which discloses high pressure stable free radical polymerization processes for preparing, for example, polyethylene rubbers; U.S. Pat. No. 5,312,704, issued May 17, 1994, entitled "MONOMODAL, MONODISPERSED TONER COMPOSITIONS AND IMAGING PROCESSES", wherein there is illustrated a toner composition comprised of pigment particles, and a resin prepared by anionic means comprised of a monomodal polymer resin or monomodal polymer resin blends and wherein the monomodal resin or resin blends possess a narrow polydispersity; U.S. Pat. No. 5,498,679, issued Mar. 12, 1996, entitled "PROCESS FOR PRODUCING BRANCHED AND STAR THERMOPLASTIC RESIN POLYMERS"; U.S. Pat. No. 5,549,998, issued Jul. 27, 1996, a divisional application of U.S. Pat. Nos. 5,322,912 and 5,401,804, entitled "POLYMERIZATION PROCESSES AND TONER COMPOSITIONS THEREFROM"; U.S. Pat. No. 5,545,504, issued Jul. 13, 1996, entitled "INK JETTABLE TONER COMPOSITIONS AND PROCESSES FOR MAKING AND USING"; U.S. Pat. No. 5,530,079, issued Jun. 26, 1996, entitled "POLYMERIZATION PROCESSES"; U.S. Pat. No. 5,552,502, issued Sep. 3, 1996, entitled "POLYMERIZATION PROCESSES"; and U.S. Pat. No. 5,608,023, issued Mar. 4, 1997, entitled "RATE ENHANCED POLYMERIZATIONS".

Attention is directed to commonly owned and assigned U.S. Pat. No. 5,852,140, issued Dec. 22, 1998, entitled "SEMISUSPENSION POLYMERIZATION PROCESSES"; U.S. Pat. No. 5,322,912, issued Jun. 21, 1994, entitled "POLYMERIZATION PROCESSES AND TONER COMPOSITIONS THEREFROM, U.S. Pat. No. 6,258,911, issued Jul. 10, 2001, entitled "BIFUNCTIONAL MACROMOLECULES AND TONER COMPOSITIONS THEREFROM"; U.S. Ser. No. 08/345,371, filed Nov. 18, 1994, entitled "POLYMERIZATION PROCESSES; U.S. Pat. No. 5,773,510, issued Jun. 30, 1998, entitled "PROCESSES FOR THE PREPARATION OF BRANCHED POLYMERS"; U.S. Pat. No. 5,739,229, issued Apr. 14, 1998, entitled "POLYMERIZATION PROCESSES"; and U.S. Pat. No. 5,723,511, issued Mar. 3, 1998, entitled "PROCESSES FOR PREPARING TELECHELIC, BRANCHED AND STAR THERMOPLASTIC RESIN POLYMER".

The disclosures of each the above mentioned patents and copending applications are incorporated herein by reference in their entirety.

BACKGROUND OF THE INVENTION

The present invention is generally directed to a processes for the preparation of polymeric particulate materials with narrow molecular weight distribution properties and narrow particle size distribution properties. More specifically, the present invention relates to improved reliability in polymerization processes for obtaining stable latexes(latices), and improved control over the resulting latex particle size and particle size distribution.

The present invention relates to processes for the preparation of polymers, and more specifically to miniemulsion polymerization processes, and to polymeric resins formed thereby. In one embodiment, the present invention relates to a stable free radical moderated miniemulsion polymerization process for producing a thermoplastic polymer resin or resins, that have narrow polydispersities, that is, narrow molecular weight distributions as defined by the ratio Mw:Mn, where Mw is weight average molecular weight of the polymer and Mn is number average molecular weight of the polymer, with an easily controllable modality, from at least one monomer compound comprising heating for an effective period of time a miniemulsified mixture of water, a free radical initiator, a stable free radical agent, an emulsifier, an optional co-surfactant and at least one substantially water insoluble polymerizable monomer compound under conditions such that all polymer chains are initiated at about the same time; cooling the mixture to effectively terminate the polymerization; optionally isolating the thermoplastic resin product; and optionally washing and drying the polymer resin products. Related miniemulsion polymerization processes for preparing, for example, thermoplastic resin are accomplished, in other embodiments, comprising: forming a miniemulsion comprised of a mixture of an oligomeric compound of the formula R—SFR, wherein R is an oligomeric compound comprised of from about 1 to about 30 monomer units and —SFR is a covalently bound stable free radical end group, at least one free radical polymerizable monomer compound, and a surfactant; and heating the miniemulsion from, for example, about 70 to about 200° C. for from, for example, about 1 to about 40 hours, preferably in a sealed vessel, wherein there results a latex thermoplastic resin or a latex of thermoplastic resins with a high monomer to polymer conversion of about 85 to 100 percent and a narrow polydispersity of from about 1.1 to about 2.0.

In another embodiment polymeric chain growth proceeds by a pseudoliving mechanism and can provide resins of variable molecular weights from very low to very high, for example, less than about 10,000 up to about 200,000 while maintaining narrow molecular weight distributions or polydispersities. In another embodiment block and multiblock copolymers can be synthesized by the aforementioned stable free radical moderated emulsion polymerization processes wherein each block formed is well defined in length by the added and reacted monomer and wherein each additional block that is formed also possesses a narrow molecular weight distribution.

Emulsion polymerization processes are known in the art, as illustrated hereinafter. Conventional emulsion polymerization processes proceed by a free radical mechanism providing resins of broad polydispersities and generally high molecular weights. The present invention relates to a miniemulsion polymerization process that proceeds via a pseudoliving free radical mechanism and provides resins of high, intermediate, or low molecular weights and with narrow polydispersities. The present invention provides product resins with a latent thermally reactive functional group on at least one end which can be used for further reaction to prepare other resins with complex architectures. The present invention, in embodiments, provides for control of the miniemulsion droplet size and the resultant resin bead or particle size, for example, as disclosed in the aforementioned copending application Ser. No. 08/037,192. The aforementioned commonly owned U.S. Ser. No. 08/214,518, discloses an emulsion polymerization process for the preparation of a thermoplastic resin or resins comprising heating from about 70 to about 160° C. a mixture comprised of water or aqueous mixtures of polar protic solvents, a water soluble or water insoluble free radical initiator, a stable free radical agent, and at least one polymerizable monomer compound which is substantially insoluble in water to form a latex thermoplastic resin or a latex of thermoplastic resins with a high monomer to polymer conversion and a narrow polydispersity.

Emulsion polymerization processes are industrially important, and are the predominant process for the synthesis of a number of copolymers, such as for example styrene/butadiene. However, resins prepared by emulsion polymerization processes typically have broad polydispersities and high molecular weights. When low molecular weight resins are required, a chain transfer agent is typically added to limit the extent of chain growth by way of premature chain termination events and which agent is, for example, an unpleasant smelling thiol compound. Polymers prepared by thiol type chain transfer mediated emulsion polymerization processes are terminated at either end with functional groups which preclude further free radical reactions and therefore limits the utility of the polymer resin products produced therefrom.

The present invention is directed to pseudoliving miniemulsion polymerization processes which permit the economic preparation of narrow polydispersity resins with low, intermediate, or high molecular weights. The low molecular weight resins can be prepared without a chain transfer agent or molecular weight modifier which provides several advantages over conventional emulsion polymerization processes as illustrated herein.

The stable free radical mediated miniemulsion polymerization system of the present invention can readily afford narrow polydispersities, in embodiments, of from about 2.0 to about 3.0, and in embodiments, of from about 1.15 to about 1.25 for polystyrene, and as low as 1.5 or below for various copolymer systems. Stable free radical mediated miniemulsion polymerization systems of the present invention afford resin polydispersities that are comparable to those obtained in anionic polymerizations.

PRIOR ART

U.S. Pat. No. 5,006,617 issued Apr. 9, 1991, and U.S. Pat. No. 4,665,142 issued May 12, 1987, both to Engel et al., disclose the preparations of polymers free from emulsifiers and protective colloids by the free-radical initiated emulsion polymerization of ethylenically unsaturated copolymerizable monomers, wherein the emulsion polymerization is carried out in the absence of emulsifiers and protective colloids, using water-soluble, free-radical forming initiators and with the addition, at least at the start of the polymerization, of at least 0.01% by weight, based on the total amount of monomers, of poly-(ethylenically unsaturated) monomers, and the polymers can be obtained in the form of aqueous or non-aqueous dispersions or in the form of powder. The use of the polymers in the form of dispersions or powders is for modifying polymer materials and polymer raw materials and for the production of shaped articles and films.

U.S. Pat. No. 4,385,157 issued May 24, 1983, to Auclair et al., discloses a novel emulsion polymerization process for preparing a latex of rubber particles having a bimodal rubber particle size distribution of large and small particles followed by grafting said rubber particles with a monomer mixture forming a poly-blend of said grafted rubber particles and a matrix phase polymer of said monomers.

Bon et al., disclose a controlled radical polymerization process using a conventional emulsion system. Latex particles are prepared by a conventional emulsion polymerization process, and the resultant latex particles are then selected as a host for the SFR polymerization, see *Macromolecules,* 1997, 30, 324–326.

The following references are also of interest: U.S. Pat. Nos. 3,682,875; 3,879,360; 3,954,722; 4,201,848; 4,542,182; 4,581,429; 4,777,230; 5,059,657; 5,173,551; 5,191,008; 5,191,009; 5,194,496; 5,216,096; and 5,247,024.

The aforementioned prior art references are incorporated in their entirety by reference herein.

In emulsion polymerization reaction processes of the prior art, various significant problems exist, for example difficulties in predicting or controlling both the polydispersity and modality of the polymers produced. These emulsion polymerization processes produce polymers with high weight average molecular weights (Mw) and low number average molecular weights (Mn) resulting in broad polydispersities or low molecular weight (Mn) and low conversion. Further, emulsion polymerization processes of the prior art are prone to generating excessive quantities of heat since the polymerization reaction is exothermic and as the viscosity of the reaction medium increases dissipation of heat becomes more difficult. This is referred to as the Trommsdorff effect as discussed and illustrated in Principles of Polymerization, G. Odian, 2nd Ed., Wiley-Interscience, N.Y., 1981, page 272, the disclosure of which is entirely incorporated herein by reference. Moreover, the exothermic nature of free radical emulsion polymerization processes is often a limitation that severely restricts the concentration of reactants or the reactor size upon scale up.

These and other disadvantages are avoided, or minimized with the miniemulsion polymerization processes of the present invention.

Thus, there remains a need for miniemulsion polymerization processes for the preparation of narrow polydispersity polymeric resins by economical and scalable free radical polymerization techniques and which polymeric resins retain many or all of their desirable physical properties, for example, hardness, low gel content, processability, clarity, high gloss durability, and the like, while avoiding the problems of gel formation, exotherms, volume limited and multi-stage reaction systems, purification, performance properties of the polymer resin products, and the like associated with prior art free radical emulsion polymerization methodologies.

The miniemulsion polymerization processes and thermoplastic resin products of the instant invention are useful in many applications, for example, as a variety of specialty applications including toner resins used for electrophotographic imaging processes or where monomodal or mixtures of monomodal narrow molecular weight resins or block copolymers with narrow molecular weight distribution within each block component are suitable for use, for example, in thermoplastic films or coating technologies.

In the emulsion polymerization processes of the prior art, various significant problems exist, for example, difficulties in predicting or controlling both the particle size and particle size distribution of the particulate products produced.

Other disadvantages associated with for example, the process as disclosed in the aforementioned commonly owned copending patent application U.S. Ser. No. 08/214,518, is that it is extremely difficult to obtain a stable latex. The stable free radical mediated miniemulsion polymerization processes of the present invention overcome this problem and allow stable latexes, or latices, to be prepared more readily. In general, miniemulsions also provide the advantage that there is better control over particle size and particle size distribution, of the droplet particles prior to polymerization, and therefore the resulting polymerized particles. The stable free radical mediated miniemulsion polymerization processes of the present invention provide an additional advantage over conventional miniemulsions since the latter are known to produce dead polymers which are incapable of further free radical polymerization. The miniemulsion polymerization processes of the present invention polymeric products with functionalized chain ends that enable optional further reaction to produce complex architectures such as blocks.

These and other disadvantages are avoided, or minimized with the processes of the present invention.

Thus, there remains a need for stable free radical miniemulsion polymerization processes which provide a stable latex whose morphology can be reproducibly prepared comprising polymer chains with functionalized chain ends that can be used for further polymerizations or chain modification reactions.

Practitioners in the art have long sought an inexpensive, efficient and environmentally efficacious means for producing narrow particle size distributions and narrow molecular weight polymers in high yield using conventional equipment, and having operator controllable or selectable particle size and particle size distribution properties. The present invention provides solutions to achieve the aforementioned desired needs.

SUMMARY OF THE INVENTION

Embodiments of the present invention, include:

overcoming, or minimizing deficiencies of prior art processes, by providing processes with improved efficiency, improved flexibility, and improved operational economies;

providing a process for the preparation of a thermoplastic resin comprising:

forming a miniemulsion comprised of a mixture of an oligomeric compound of the formula R—SFR, wherein R is an oligomeric compound comprised of from about 1 to about 30 monomer units and optionally a covalently bonded free radical initiator compound, —SFR is a covalently bound stable free radical end group, and at least one free radical polymerizable monomer compound, and a surfactant; and heating the miniemulsion from, for example, about 70 to about 200° C. for about for example, 1 to about 40 hours preferably in a sealed vessel, wherein there results a latex thermoplastic resin or a latex of thermoplastic resins with a high monomer to polymer conversion of about 85 to 100 percent and a narrow polydispersity of from about 1.1 to about 2.0.

providing a process for the preparation of a thermoplastic resin comprising:

forming a miniemulsion comprised of a mixture of a free radical initiator compound, a stable free radical agent, at least one free radical polymerizable monomer compound, a surfactant; and heating the miniemulsion from about 70 to about 200° C. for about 1 to about 40 hours in a sealed vessel, wherein there results a latex thermoplastic resin or a latex of thermoplastic resins with a high monomer to polymer conversion of about 85 to 100 percent and a narrow polydispersity of from about 1.1 to about 2.0.

In the above embodiments there can be included in the miniemulsion reaction mixture a co-surfactant. The cosurfactant acts to reduce Oswald ripening thereby maintaining the size and number of particles. Instability of the dispersed monomer droplets could result in latex failure or poor reproducibility of the process.

Still other embodiments of the present invention include stable free radical mediated polymerization processes for the preparation of a multiblock copolymer thermoplastic resin comprising: forming a miniemulsion comprised of a mixture of an oligomeric compound of the formula R—SFR and at least one free radical polymerizable monomer compound along with other optional additives; heating the miniemulsion to form a first intermediate product resin; and thereafter repeatedly reacting the resulting product with successively added monomers which monomers are different from the previously polymerized monomer to form well defined multiblock copolymer thermoplastics as illustrated herein.

DETAILED DESCRIPTION OF THE INVENTION

The stable free radical mediated miniemulsion polymerization processes of the present invention may be used to process and prepare a variety of polymeric materials, including toner particles for used in liquid and dry developer marking applications in a cost efficient manner. An advantage of the present invention is that the processes thereof afford control over the particle size, particle size distribution properties of the resulting fine particulate products, and precise control over the molecular weight and molecular weight distribution properties of the resulting polymer products.

In embodiments, the present invention provides a process for the preparation of a thermoplastic resin comprising:

forming a miniemulsion comprised of a mixture of an oligomeric compound of the formula R—SFR, wherein R is an oligomeric compound comprised, for example, of from about 1 to about 30, and preferably from 5 to about 20 monomer units and optionally a covalently bonded free radical initiator compound, and wherein —SFR is a covalently bound stable free radical end group, and at least one free radical polymerizable monomer compound, and a surfactant; and heating the miniemulsion from about 70 to about 200° C., and preferably from about 110 to about 165 degrees Centigrade, for about 1 to about 40, and preferably from about 5 to about 20 hours in a suitable sealed vessel, wherein there results a latex thermoplastic resin or a latex of thermoplastic resins with a high monomer to polymer conversion of about 85 to 100 percent and a narrow polydispersity of from about 1.1 to about 2.0.

In embodiments, the present invention provides a process for the preparation of a thermoplastic resin comprising:

providing a process for the preparation of a thermoplastic resin comprising:

forming a miniemulsion comprised of a mixture of a free radical initiator compound, a stable free radical agent, at least one free radical polymerizable monomer compound, a surfactant; and heating the miniemulsion from about 70 to about 200° C. for about 1 to about 40 hours in a sealed vessel, wherein there results a latex thermoplastic resin or a latex of thermoplastic resins with a high monomer to polymer conversion of about 85 to 100 percent and a narrow polydispersity of from about 1.1 to about 2.0.

Oligomeric initiator compounds useful in the present invention, in embodiments, are of the formula general R—SFR, where R comprises an oligomeric compound comprised, for example, of from about 1 to about 30 monomer units and optionally a covalently bonded free radical initiator compound at one end of the oligomer chain, and —SFR is a covalently bound stable free radical end group at the other end of the oligomeric chain. An oligomeric initiator compound R—SFR useful in embodiments of the present invention, is of is of the formula

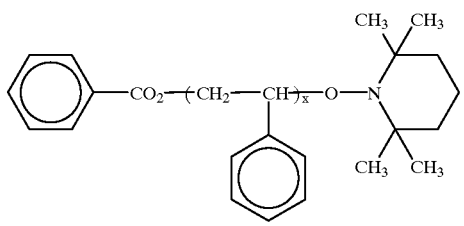

where x is an integer from 1 to about 30 and represents the number of monomers in the oligomeric chain, the benzoate end group represents an optional covalently bound free radical initiator compound, and the nitroxyl group represents the covalently bound stable free radical agent. It is readily appreciated by one of ordinary skill in the art that the oligomeric initiator compound can be comprised of numerous other related chemical structures, for example, the monomer, the —SFR group, and the optional free radical end groups, can be selected as recited above or can be a various chemical equivalents, for example, as recited and as illustrated herein. In embodiments, the miniemulsion further comprises an acid or base buffer compound selected from the group consisting of alkali metal and alkaline earth carbonates, bicarbonates, acetates, borates, and mixtures thereof. In other embodiments, it is desirable to select a oligomeric initiator compound containing one or more —SFR groups, for example, di-, tri-, tetra-, and the like, functionalized oligomeric initiators, reference for example, the aforementioned copending U.S. Ser. No. 08/292,670, wherein there is disclosed bifunctional initiators and oligomers thereof that are suitable for use in the present invention, reference also the aforementioned copending U.S. Ser. No. 08/413,645 and U.S. Ser. No. 08/664,702 and which applications disclose compounds and methods for the preparation of malfunctioned branched polymers, which compounds and methods are believed applicable to the preparation of oligomeric initiator compounds of the present invention.

In embodiments, the miniemulsion further comprises a cosurfactant, for example, compounds that have a low water solubility, or are substantially insoluble, such as long chain hydrocarbons with from 10 to about 40, and preferably from about 15 to about 25 carbon atoms, alcohols, mercaptans, carboxylic acids, ketones, amines, or any other long chain molecules, with or without functional groups that do not substantially interfere with the SFR or mini-emulsion chemistry, for example, dodecyl mercaptan, hexadecane, cetyl alcohol, and the like, and mixtures thereof, wherein the cosurfactant is in a mole ratio of, for example, from about 0.004 to about 0.08, and preferably from about 0.005 to about 0.05 with respect to the monomer compounds, a mole ratio of from about 0.1 to about a 10, and preferably from about 0.5 to about 5.0 with respect to surfactant. In embodiments, the cosurfactant can be a linear or branched hydrocarbon with from about 5 to about 40 carbon atoms, a linear or branched aliphatic alcohol with from about 5 to about 40 carbon atoms, wherein the cosurfactant is in a mole ratio of from about 0.01 to about 0.04 with respect to the monomer compounds, a mole ratio of from about 0.5 to about 6.0 with respect to the surfactant, and wherein the cosurfactant prevents, or minimizes coalesence of the miniemulsion droplets. In embodiments, the cosurfactant is in a mole ratio of from about 0.012 to about 0.025 with respect to the monomer compounds, and wherein the cosurfactant prevents coalesence of the miniemulsion droplets. The cosurfactant can also be a high polymer, "activator". An activator, in embodiments of the present invention, can be a high polymer that is added in amounts, for example, of from about 0.1 to about 2 weight percent based on the weight of miniemulsion droplets which activator compound is believed to reduce or eliminate Oswald ripening phenomena, that is, the growth of larger particles with the concomitant shrinkage of smaller particles. The activator compound is also believed to increase the fraction of miniemulsion droplets which capture free radicals and become active growing polymer particles.

In embodiments, the miniemulsion is prepared by mixing a nitroxide containing oligomeric compound, for example, a TEMPO-terminated oligomer, optionally a co-surfactant, and at least one polymerizable monomer compound. To the mixture is added a mixture of surfactant, water, and optionally a buffering compound. The resulting combined organic and aqueous phases are first optionally stirred magnetically and then subjected to a high shear force, for example, using a piston homogenizer, to form miniemulsion droplets that appear as a milky white latex. In embodiments, the aforementioned TEMPO terminated oligomeric initiator compound can, if desired, be formed in situ by combining a free radical initiator compound, a stable free radical compound, and one or more monomers.

In embodiments, the miniemulsion can be formed in a variety of high shear mixing devices, for example, a piston homogenization, a microfluidizer, a polytron, an unltrasonicator, and the like. In embodiments, the miniemulsion is preferably formed in a piston homogenizer at from about 1 to about 60 minutes at a pressure of about 1,000 to about 10,000 psi. The miniemulsion prior to heating is comprised of droplets of the oligomer and monomer with a volume average diameter, for example, of from about 100 to about 400 nanometers. The heating of the miniemulsion is accomplished, for example, at from about 100 to about 160° C. for from about 2 to about 10 hours.

In embodiments, polymerization processes of the present invention further comprises separating the solid latex particles from the liquid phase in the resulting latex which separation can be accomplished by conventional methods, such as, filtration, sedimentation, spray drying, and the like.

In embodiments, at least one monomer compound is selected for polymerization, while in other embodiments, from about 2 to about 5, different monomers are selected for the monomer component and can be simultaneously or sequentially polymerized. The weight average molecular weight (Mw) of the resulting resin is from about 3,000 to about 200,000, and preferably 10,000 to about 150,000.

The thermoplastic resin products isolated from the miniemulsion polymerization process of the present invention, in embodiments, can have a monomer to polymer conversion of about 90 to about 99.9, and for example, from about 95 to about 99.5 percent.

The stable free radical group —SFR of the oligomeric initiator compound is, for example, compounds such as 2,2,5,5-tetramethyl-1-pyrrolidinyloxy compounds, 2,2,6,6-tetramethyl-1-piperidinyloxy compounds, 4,4-dimethyl-3-oxazolinyloxy compounds, di-tertiary alkyl substituted nitroxide compounds, and the like compounds, and mixtures thereof. Other —SFR groups and compounds are illustrated in the appropriate U.S. patents recited herein, such as non-nitroxyl compounds disclosed in U.S. Pat. No. 5,530,079.

In embodiments, the weight ratio of oligomeric initiator R—SFR to monomer can be from about 0.001:100 to about 1.0:1.0, and preferably from about 0.01:100 to about 0.01:10.

The monomer compound can be free radical polymerizable monomers, for example, styrene compounds, conjugated compounds, acrylates compounds, 9-vinyl carbazole compounds, vinyl chloride compounds, vinyl acetate compounds, and the like polymerizable monomers, and mixtures thereof. More specifically the monomer can be styrene, alkyl substituted styrenes with from 1 to about 20 carbon atoms, butadiene, alkyl methacrylate, and the like compounds, and mixtures thereof.

In embodiments, the present invention provides a process for the preparation of a multiblock copolymer thermoplastic resin comprising:

forming a miniemulsion comprised of a mixture of an oligomeric compound of the formula R—SFR, wherein R is an oligomeric compound comprised of from about 2 to about 30 monomer units and optionally a covalently bonded free radical initiator compound, —SFR is a covalently bound stable free radical end group, and at least one free radical polymerizable monomer compound, a surfactant; and optionally a co-surfactant, optionally a buffer compound, optionally a high molecular weight "activator" polymer compound with, for example, a molecular weight from about 25,000 to about 2,000,000, in an amount of from about 0.01 to about 2 weight percent based on amount of monomer which activator, although not desired to be limited by theory, is believed to serve as or functions to minimize Oswald ripening as well as to enhance nucleation of the monomer droplets;

heating the miniemulsion from about 70 to about 200° C. for about 1 to about 40 hours in a sealed vessel, optionally cooling the resulting mixture;

optionally isolating said first intermediate product resin from the mixture;

adding to said first intermediate product resin a second mixture comprised of at least one polymerizable monomer compound, wherein said polymerizable monomer compound of said second mixture is different from said polymerizable monomer or monomers of said first mixture, to form a combined second mixture;

heating said combined second mixture to form a third mixture comprised of a block copolymer thermoplastic resin comprised of a first product resin formed from said first intermediate product resin and added said second monomer;

cooling the resulting third mixture;

optionally isolating the resin from said third mixture;

sequentially repeating the preceding three steps of adding, heating and cooling, N times, wherein N represents a number, to form a fourth mixture containing a multiblock copolymer thermoplastic resin or resins having N+2 blocks and wherein N is the number of times said sequence is repeated;

optionally isolating said multiblock copolymer thermoplastic resin from said fourth mixture; and optionally washing and drying said multiblock copolymer thermoplastic resin and wherein said multiblock copolymer thermoplastic resin possesses a narrow polydispersity and a modality of 1. In embodiments, N can be from to about 20.

During the reaction of monomer or mixed monomers to form polymers, the reaction time may be varied over about 1 to 60 hours, preferably between about 2 to 10 hours and optimally about 3 to 7 hours. The optimal reaction time may vary depending upon the temperature, the volume and scale of the reaction, and the quantity and type of polymerization initiator and stable free radical agent selected.

When a free radical initiator compound is selected as the initiator component in forming the oligomeric compound of the present process, it can be any free radical polymerization initiator capable of initiating a free radical polymerization process and forming the oligomeric compound, and includes peroxide initiators such as benzoyl peroxide and azo initiators such as azobisisobutyronitrile, and the like. The initiator concentration employed in forming the oligomeric compound, for example, is about 0.2 to 2.5 weight percent, of the total weight of monomer to be polymerized and is determined by the desired molecular weight and structure of the oligomer and the desired resin. As the initiator concentration is decreased relative to the weight of molar equivalents of monomer used, the molecular weight of the thermoplastic resin product increases.

Water soluble free radical initiators can be employed in the processes of this invention to prepare the oligomeric compounds and are those that are traditionally used in emulsion polymerization. Examples of water soluble free radical initiators are persulfates, water soluble peroxides and hydroperoxides; more specifically, sodium, potassium and ammonium persulfate, hydrogen peroxide, t-butyl hydroperoxide, cumene hydroperoxide, para-menthane hydroperoxide, and peroxy carbonates. Other water soluble initiators of similar decomposition mechanism may be used if desired.

A preferred initiator is one which has a one-hour half-life at about 60 to 90° C. and a ten-hour half-life at about 50 to 80° C. Other peroxides, such as peresters and peracids having somewhat higher one-hour half-life/temperature relationships, may also be used if they are accompanied by a promoter compounds such as tertiary amine, for example: 2,4-dimethyl-2,5-dibenzyl peroxyhexane.

Particularly preferred free radical initiators are water soluble and water insoluble persulfate compounds.

The monomer or monomers to be polymerized are miniemulsified in water or aqueous mixtures of polar protic organic solvents which are substantially insoluble in the monomer phase with the aid of optionally added micelle-forming emulsifying agents. The resultant aqueous suspension usually contains a suitable water-soluble, free-radical generating initiator such as a peroxide or a persulfate, and the like, as defined above. The monomer or monomers are used in effective amounts relative to the free radical initiator, stable free radical agent, surfactant, and optional cosurfactant, as illustrated for example hereinafter.

Suitable surfactants which can be employed in the practice of the present invention include anionic, cationic, amphoteric, and nonionic emulsifiers customarily used in emulsion polymerization. In a preferred embodiment, the surfactant is selected from nonionic surfactants, which class of surfactants are generally better suited to the higher temperatures associated with the present processes. Representative types of anionic emulsifiers are the alkylaryl sulfonates, alkali metal alkyl sulfates, the sulfonated alkyl esters, the fatty acid soaps, and the like, such as sodium alpha-olefin ($C_{14}$–$C_{16}$) sulfonates.

Particularly preferred surfactants are the nonionics, for example, ethoxylated octyl or nonyl phenols.

The surfactant can be employed in varying amounts providing that adequate miniemulsification is achieved by, for example, exceeding the critical micelle concentration (CMC). As a general rule, the surfactants are present in an amount of from about 0.02 to 8.0 weight percent, and preferably from about 0.4 to about 6.0 weight percent, based on the total weight of monomer to be polymerized. A listing of various other suitable surfactants which may be useful in the invention process is found in the book "McCutcheon's Emulsifiers and Detergents 1981 Annuals", which is incorporated by reference herein in its entirety.

Cosurfactants are added to minimize diffusion due to Oswald ripening. Cosurfactants, in embodiments, are typically highly water insoluble compounds, such as hexadecane and cetyl alcohol, and are used in molar ratios of about 0.01 to about 10, and preferably from about 0.1 to about 5 based on the surfactant. Alternatively, high polymer, activator compounds, can be added in minor amounts to enhance droplet nucleation as well as minimize Oswald ripening. Activators are typically used in amounts of from about 0.01 to about 2 weight percent based on monomer. The molecular weight of the activator, in embodiments, can range from about 25,000 to about 500,000, and preferably from about 50,000 to about 250,000.

The stable free radical agent can be any stable free radical and includes nitroxide free radicals, for example, PROXYL (2,2 5,5-tetramethyl-1-pyrrolidinyloxy) and derivatives thereof, DOXYL (4,4-dimethyl-3-oxazolinyloxy) and derivatives thereof, and TEMPO (2,2,6,6-tetramethyl-1-piperidinyloxy) and derivatives thereof, and the like. These stable free radical agent materials are well known in the literature, for example G. Moad et. al., *Tetrahedron Letters*, 22, 1165 (1981) as free radical polymerization inhibitors. The stable free radical agents are preferably soluble in the water insoluble monomer phase where predominantly all the polymerization of monomers occurs. Stable free radical agents which have some water solubility are still useful, but may result in less predictable polymerization processes.

The molar ratio of the stable free radical (SFR) agent to free radical initiator (INIT) residing in the same phase is from about 0.4 to 2.5, and preferably in the range from about 0.9 to 1.6. Although not wanting to be limited by theory, in an embodiment, the molar ratio [SFR:INIT.] of stable free radical agent, for example, TEMPO, to free radical initiator, for example, benzoyl peroxide, of about 1.3 is believed to be important for success of the process. If the [SFR:INIT.] is too high then the reaction rate is noticeably inhibited. If the [SFR:INIT.] is too low then the reaction product has undesired increased polydispersity.

In embodiments, the molar ratio of monomer content to stable free radical agent to free radical initiator is from about 100:0.2:1 to about 10,000:2.5:1 and preferably in the range of about 300:1.3:1 to about 7,000:1.3:1.

Processes of the instant invention, in embodiments, provide for high monomer to polymer conversion levels, or degrees of polymerization, and preferably, for example, of about 90 percent by weight or greater.

The monomers that can be used are any monomer capable of undergoing a free radical polymerization and include but are not limited to styrene compounds, such as substituted styrenes, for example methylstyrene and the like compounds, acrylates, methacrylates, butadiene and any conjugated diene monomer sufficiently reactive under the specified stable free radical moderated polymerization reaction conditions to afford a stable free radical reaction adduct and high molecular weight polymer product, for example, isoprene and myrcene. Other monomers include for example 9-vinyl carbazole compounds, vinyl chloride compounds, vinyl acetate compounds, and mixtures thereof including the above mentioned monomers and the polymerizable monomers recited below for suitable toner resins.

The polymeric products of the present invention may be optionally crosslinked with, for example, known crosslinking or curing agents such as divinyl benzene and the like, either in situ or in a separate post polymerization process step.

Additional optional known additives may be used in the polymerization reactions which do not interfere with the objects of the invention and which may provide additional performance enhancements to the resulting product, for example, colorants, lubricants, release or transfer agents, surfactants, stabilizers, antifoams, antioxidants, and the like.

In embodiments, there can be incorporated into the monomer before or during the emulsion polymerization process a waxy component, such as alkylenes, like polyethylene, polypropylene waxes, and mixtures thereof having a low molecular weight of from between about 1,000 to about 20,000 in amounts of from about 0.1 to about 15 weight percent of the total monomer polymerized. Alternatively, the waxy component may be added to the isolated polymeric product of the process. The use of such a component may be desirable for certain toner applications. Suitable low molecular weight waxes are disclosed in U.S. Pat. No. 4,659,641, the disclosure of which is totally incorporated herein by reference.

The oligomer stable free radical (SFR) mediated emulsion polymerization process of the present invention possesses numerous and significant differences compared to a conventional emulsion polymerization process. For example, SFR mediated emulsion polymerization kinetics differ from a conventional emulsion polymerization principally because of the reversibly capped nitroxide oligomers and polymers.

In a conventional emulsion polymerization there are three distinct phases or stages of the emulsion polymerization process. The first stage is the formation of polymer particles, the second is the consumption of the monomer droplets by diffusion, and the third is the consumption of the monomer by the particles. During these phases or stages there is constant polymer chain initiation. Chain propagation is typically quite rapid. There is a point at which the polymer particles are believed to possess a "sticky" or tacky surface characteristic, but this point is believed to be short lived. In marked contrast, in a SFR mediated emulsion polymerization of the present invention, while the three stages are also believed to exist, the time duration of each phase or stage is believed to be considerably different from to a conventional emulsion polymerization. In an SFR mediated emulsion polymerization, the initiation stage is quite rapid and is complete within minutes and does not continue throughout the polymerization. In addition to the surfactant, the free radical initiator compound of the SFR mediated process can, in embodiments, for example when added separately or when bonded to the oligomeric initiator compound can act to stabilize the emulsion particles of the present invention. Having all of the initiator activated at once and not released or dispersed throughout the polymerization system could potentially result in latex destabilization as in a conventional system but does not appear to be the situation in the present invention. Furthermore, in an SFR mediated emulsion polymerization process the propagation process compared to a conventional emulsion polymerization process is relatively slow. This means that the particles will be in their sticky state or phase for a considerably longer period of time and also suggests that the sticky particles are prone to coalesence or aggregation, but which coalesence and aggregation is not observed.

Apparently, reference the aforementioned *Macromolecules,* 1997, 30, 324–326 publication, it is difficult to form stable emulsion latex particles under the SFR emulsion polymerization conditions. However, in an SFR miniemulsion of the present invention, there is no discrete particle formation and growth stage. The initial monomer droplets experience high shear forces which form smaller droplets whose size depends on the shear, typically from about 100 to about 1,000 nanometers in diameter. A water soluble or organic soluble initiator can be used. In either situation, the monomer polymerization occurs in the droplets and not in the aqueous phase. The kinetics and mechanism of a SFR mediated miniemuslion polymerization processes of the present invention are in many aspects akin to a neat or bulk reaction, that is, the conditions in certain aspects more closely resemble a mini-suspension reaction. It is known in the art that to obtain a stable miniemulsion it is necessary to use a cosurfactant to minimize monomer diffusion, that is Oswald ripening. Cetyl alcohol and hexadecane are examples of cosurfactants typically used for that purpose. Although not desired to be limited by theory, it is believed that by conducting the SFR mediated miniemulsion polymerization processes of the present invention with the aforementioned oligomeric or macromeric initiator compounds, R—SFR, the presence of a cosurfactant, in embodiments, is unnecessary.

Toner compositions can be prepared by a number of known methods, such as admixing and heating resin, or polymer particles obtained with the processes of the present invention such as water soluble or insoluble styrene butadiene copolymers, colorants, such as pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter. Alternatively, the toner compositions are ground with a fluid bed grinder equipped with a classifier wheel constructed in accordance with the present invention, and then classified using a classifier equipped with a classifier wheel constructed in accordance with the present invention. In embodiments, a toner can be prepared directly, thereby foregoing the extensive particle sizing and separation process by including, for example, a suitable colorant in the miniemulsion droplets prior to polymerization, and thereafter isolating the resulting colored toner particles.

Illustrative examples of resins suitable for toner and developer compositions include branched styrene acrylates, styrene methacrylates, styrene butadienes, vinyl resins, including branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable colorants, such as pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO \cdot Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 10 percent by weight, and preferably in an amount of from about 0.1 percent by weight to about 5 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned-pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. Nos. 3,526,533, 4,937,166, and 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, more preferably from about 8 to about 12 microns, and most preferably from about 5 to about 8 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophbtographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared, in embodiments, of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The invention will further be illustrated in the following non limiting Examples, it being understood that the Examples are intended to be illustrative only and that the invention is not intended to be limited to the materials, conditions, process parameters, and the like, recited herein. Parts and percentages are by weight unless otherwise indicated.

Comparative Example I
Stable Free Radical Mediated Emulsion Polymerization

A nonionic surfactant, POLYSTEP OP-3070 (5.20 gm, available from Stephan Chemical Co.) was mixed with 120 mL of water and stirred on a magnetic stirrer for 10 minutes. A stable free radical agent, 2,2,6,6-tetramethylpiperidinyloxy radical (TEMPO, 0.329g), was dissolved in 30 gm of styrene and then added to the surfactant solution, and stirred for about 20 minutes with magnetic stirring. A free radical initiator, potassium persulfate (0.505 gm) was then added. The resulting emulsion was transferred to a PARR reactor and stirred at 200 rpm and purged with argon for several minutes. The reactor was then heated to 135° C. for 4 hours. Upon cooling the reaction mixture, a milky white latex, a white solid precipitate immediately settled out. The precipitate was isolated by filtration, washed and dried. The precipitate was analyzed by GPC and found to be polymer with a Mw of 10,765 with a polydispersity of 1.14. The unreacted monomer content in the crude reaction mixture was 26% by weight based on the original monomer amount as measured by GPC.

EXAMPLE I
Stable Free Radical Mediated Miniemulsion Polymerization

A nonionic surfactant, POLYSTEP OP-3070 (1.25 gm), available from Stephan Chemical Co., was mixed with 80 mL of water and stirred on a magnetic stirrer for 10 minutes. Hexadecane (0.87 gm) and 2,2,6,6-tetramethylpiperidinyloxy radical (TEMPO, 0.09 gm) were dissolved in 20 gm of styrene, added to the surfactant solution, and stirred for 20 minutes with magnetic stirring. The mixture was then piston homogenized for 3 minutes at 6,000 psi resulting in a milky white latex. To the latex was added 0.131 gm of potassium persulfate. The latex was transferred to a PARR reactor and stirred at 200 rpm while being purged with argon for several minutes. The reactor was then heated to 135° C. for 3 hours. Upon cooling a milky white latex with no oil layer on top and no fouling was obtained. The polymer in the latex was analyzed by GPC and found to have a Mw of 25,777 with a polydispersity of 1.34. The monomer content of the latex was measured and found to be less than 1%.

EXAMPLE II
Stable Free Radical Oligomer Mediated Miniemulsion Polymerization

A TEMPO terminated styrene oligomer (0.155 gm, Mn 1,216, polydispersity=1.08) prepared as disclosed in the aforementioned commonly owned U.S. Pat. No. 5,332,912 was dissolved in 22 mL of styrene and 0.753 gm of hexadecane was then added. This solution was added to 0.25 gm of sodium lauryl sulfate and 0.004 gm of sodium bicarbonate dissolved in 79 mL of water. The resulting mixture was stirred with magnetic stirring for 20 minutes. It was the passed through a piston homogenizer (Union Pump Model HTD1) for 2 minutes operating at an inlet pressure of 6,000 psi. The resulting milky white fluid was then transferred to a PARR reactor and purged with argon for 5 minutes while stirring at 156 rpm. The purging was stopped and the temperature was increased to 125 C. and maintain at that temperature for 4 hours. The resulting product was a milky white latex with a small oil layer on the surface thereof which layer was identified as unreacted monomer. The unreacted monomer was readily separated by gravity and the latex was analyzed by GPC and indicated that Mw=49,910, Mn=40,159, Mp=52,603, and polydispersity PD=1.24. The conversion was in the 50% range.

EXAMPLE III
Stable Free Radical Mediated Miniemulsion Polymerization

A TEMPO terminated styrene oligomer (0.90 gm, Mn 1,387, polydispersity=1.06) prepared as disclosed in the aforementioned commonly owned U.S. Pat. No. 5,332,912 was dissolved in 22 mL of styrene and 0.883 gm of hexadecane was then added. This solution was added to 1.28 gm of Polystep OP-3070 dissolved in 80 mL of water. The resulting mixture was stirred with magnetic stirring for 20 minutes. It was the passed through a piston homogenizer (Union Pump Model HTD1) for 3 minutes operating at an inlet pressure of 6,000 psi. The resulting milky white fluid was then transferred to a PARR reactor and purged with argon for 5 minutes while stirring at 156 rpm. The purging was stopped and the temperature was increased to 135 C. and maintain at that temperature for 3 hours. The resulting product was a milky white latex which was analyzed by GPC and indicated that Mw=15,660 Mn=11,808 Mp=18,180, and polydispersity PD=1.33. The reaction was repeated except that the reaction time was increased from 3 hours to 6 hours. After 6 hours of polymerization a milky white latex was obtained which was analyzed by GPC and indicated that the polymer had a Mw=27,207, Mn=21,926, Mp=31,173. The conversion was 75%.

EXAMPLE IV
Magnetic Toner Preparation and Evaluation

A polymer resin (74 weight percent of the total mixture) obtained by stable free radical miniemulsion polymerization of mixtures of styrene and butadiene may be melt extruded with 10 weight percent of REGAL 330® carbon black and 16 weight percent of MAPICO BLACK® magnetite at 120° C., and the extrudate pulverized in a Waring blender and jetted and classified to 8 micron number average sized particles as measured by a Coulter counter. A positively charging magnetic toner may be prepared by surface treating the jetted toner (2 grams) with 0.12 gram of a 1:1 weight ratio of AEROSIL R972® (Degussa) and TP-302 a naphthalene sulfonate and quaternary ammonium salt (Nachem/Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028® soft silicone roll fuser, operated at 7.62 cm (3 inches) per second.

The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners. Typically greater than 95 percent of the toner image remains fixed to the copy sheet after removing a tape strip as determined by a densitometer. Alternatively, the fixed level may be quantitated using the known crease test, reference the aforementioned U.S. Pat. No. 5,312,704.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference; images for toner compositions prepared from the copolymers derived from for example, Example XI are expected to be of excellent quality with no background deposits and of high resolution over an extended number of imaging cycles exceeding, it is believed, about 75,000 imaging cycles.

Other toner compositions may be readily prepared by conventional means from the pigmented thermoplastic resins particles obtained from the improved miniemulsion polymerization processes of the present invention, including colored toners, single component toners, multi-component toners, toners containing special performance additives, and the like.

In embodiments, the processes of the present invention can be selected for and employed in preparing polymeric particulate materials including, but not limited to, crystalline, semicrystalline, and amorphous polymeric materials, and mixtures thereof.

Other modifications of the present invention may occur to one of ordinary skill in the art based upon a review of the present application and these modifications, including equivalents thereof, are intended to be included within the scope of the present invention.

What is claimed is:

1. A process for the preparation of a multiblock copolymer thermoplastic resin comprising:

forming a miniemulsion comprised of a mixture of an oligomeric compound of the formula R—SFR, wherein R is an oligomeric compound comprised of from about 2 to about 30 monomer units and optionally a covalently bonded free radical initiator compound, —SFR is a covalently bound stable free radical end group, and at least one free radical polymerizable monomer compound, a surfactant; and heating the miniemulsion to form a mixture containing a first intermediate product resin, optionally cooling the resulting mixture;

optionally isolating said first intermediate product resin from the mixture;

adding to said first intermediate product resin a second mixture comprised of at least one polymerizable monomer compound, wherein said polymerizable monomer compound of said second mixture is different from said polymerizable monomer or monomers of said first mixture, to form a combined second mixture;

heating said combined second mixture to form a third mixture comprised of a block copolymer thermoplastic resin comprised of a first product resin formed from said first intermediate product resin and added said second monomer;

cooling the resulting third mixture;

optionally isolating the resin from said third mixture;

sequentially repeating the preceding three steps of adding, heating and cooling, N times, wherein N represents a number, to form a fourth mixture containing a multiblock copolymer thermoplastic resin or resins having N+2 blocks and wherein N is the number of times said sequence is repeated;

optionally isolating said multiblock copolymer thermoplastic resin from said fourth mixture; and optionally washing and drying said multiblock copolymer thermoplastic resin and wherein said multiblock copolymer thermoplastic resin possesses a narrow polydispersity and a modality of 1.

2. A process in accordance with claim 1, wherein N is from 1 to about 20.

* * * * *